United States Patent [19]

Seagrave et al.

[11] Patent Number: 4,570,571

[45] Date of Patent: Feb. 18, 1986

[54] APPARATUS FOR APPLYING UV INK TO GLASS FIBERS

[75] Inventors: Earl M. Seagrave; Edmond H. Machen, both of Charlotte, N.C.

[73] Assignee: Fusion UV Curing Systems Corporation, Rockville, Md.

[21] Appl. No.: 630,007

[22] Filed: Jul. 12, 1984

[51] Int. Cl.⁴ .............................................. B05C 1/08
[52] U.S. Cl. ................... 118/642; 118/234; 118/249; 118/262; 118/DIG. 20
[58] Field of Search ............... 118/234, DIG. 20, 262, 118/249, 641, 642, 250

[56] References Cited

U.S. PATENT DOCUMENTS

| | | | |
|---|---|---|---|
| 2,257,261 | 9/1941 | Knowlton | 118/262 |
| 2,329,034 | 9/1943 | Buck et al. | 118/262 X |
| 2,885,999 | 5/1959 | Dieffenbacher et al. | 118/234 X |
| 4,047,271 | 9/1977 | Paterson et al. | 118/234 X |
| 4,192,712 | 3/1980 | Dreher | 118/262 X |
| 4,455,159 | 6/1984 | Lamb et al. | 118/234 X |

*Primary Examiner*—John P. McIntosh
*Attorney, Agent, or Firm*—Bell, Seltzer, Park & Gibson

[57] ABSTRACT

An apparatus is provided which applies and cures a coating of viscous ink to a moving strand material. This apparatus includes an ink applicator module which comprises a series of rotatable rollers which receive and apply the ink to the moving strand. This apparatus allows substantial quantities of glass fiber waveguide strand material to thus be coated with a UV curable ink in a relatively short period of time so that they may be color coded to facilitate handling and installation.

14 Claims, 10 Drawing Figures

APPARATUS FOR APPLYING UV INK TO GLASS FIBERS

FIELD OF THE INVENTION

This invention relates to apparatus for applying and curing a coating of a viscous ink to a moving strand material. More particularly, this invention is directed to such apparatus for applying such a coating to glass fiber waveguides and the coating being an ultraviolet curable ink.

BACKGROUND OF THE INVENTION

The use of optical glass fiber waveguides as a desired means for transmitting data has continued to grow in popularity. Fiber optic linkages have a very high information carrying capacity for their relatively small cross-sectional size, particularly in comparison to metal conductor wires.

Typical data transmission systems and lines employ great numbers of these glass fiber waveguides bundled into relatively small spaces. But since they are virtually identical in appearance, it is practically impossible to properly interconnect and splice these waveguides together without some assistance in their identification.

A desired manner of such identification is disclosed in commonly owned co-pending U.S. patent application Ser. No. 582,091 filed Feb. 21, 1984, which deals with providing color coded optical fiber waveguides. As discussed therein, the waveguides are color coded such as in accordance with the standard telecommunication code as metal conductor wires typically are so as to provide ready and sure identification. This color coding is accomplished by applying a relatively thin and uniform coating of colored ink on the waveguides. The ink is preferably a viscous ultraviolet curable ink which is capable of being applied in very precise amounts.

Conventional apparatus, however, is not capable of applying the ink in a desired manner. It has been therefore necessary to develop apparatus that can accomplish this.

SUMMARY OF THE INVENTION

In accordance with the present invention there is accordingly provided apparatus for applying and curing a coating of a curable viscous ink to a moving strand material, which apparatus comprises strand supply and takeup spools, a supply of curable viscous ink, ink applicator apparatus and means for curing the coating of the ink, with the ink application and curing taking place continuously while the strand is moving from the supply spool to the takeup spool. The coating of viscous ink can be UV curable in which case there can be provided a source of ultraviolet radiation as the means for curing the ink.

The ink applicator apparatus thereof comprises a series of rotatable rollers successively arranged in driving engagement. When rotated, these rollers successively transfer the ink from an ink receiving nip defined by first adjacent rollers along intermediate rollers and finally to an applicator roller at the applicator end of the series. The applicator roller is adapted for applying the ink to the moving strand in the desired fashion so that as the ink is applied by the applicator roller it is removed by and applied to the strand.

The series of rollers can include an ink positioning roller which has a peripheral surface formed of a resilient elastomeric material and which has a circumferentially extending concavity formed therein. This positioning roller effects a centering of the ink deposited on it and on successive rollers for more precise ink placement.

The moving strand is directed substantially tangentially across the surface of the applicator roller and a substantially uniform thickness coating of ink is thereby applied to the strand. In connection with this, a weighted roller can be included in association with the applicator roller and in peripheral contact therewith to maintain a predetermined contact pressure of the strand as it contacts the applicator roller and assists in ink application.

BRIEF DESCRIPTION OF THE DRAWINGS

Further and more specific features and advantages of the invention will become more apparent when taken in connection with the accompanying drawings, in which.

DETAILED DESCRIPTION OF THE INVENTION

While the present invention will be described more fully hereinafter with reference to the accompanying drawings, in which particular embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to pesons of skill in the appropriate arts, and not as limiting upon the present invention.

Figure 1:
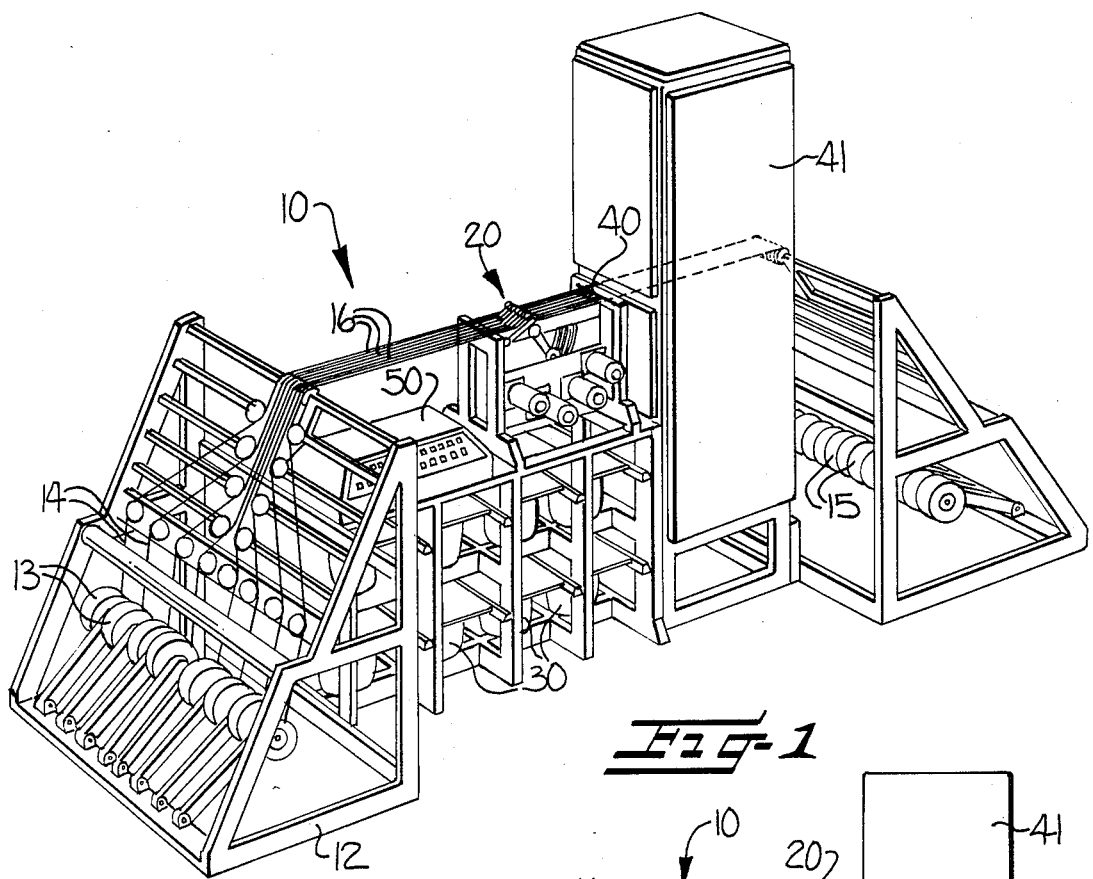
FIG. 1 is a perspective view of a machine of the invention having a plurality of operating positions.
Figure 2:
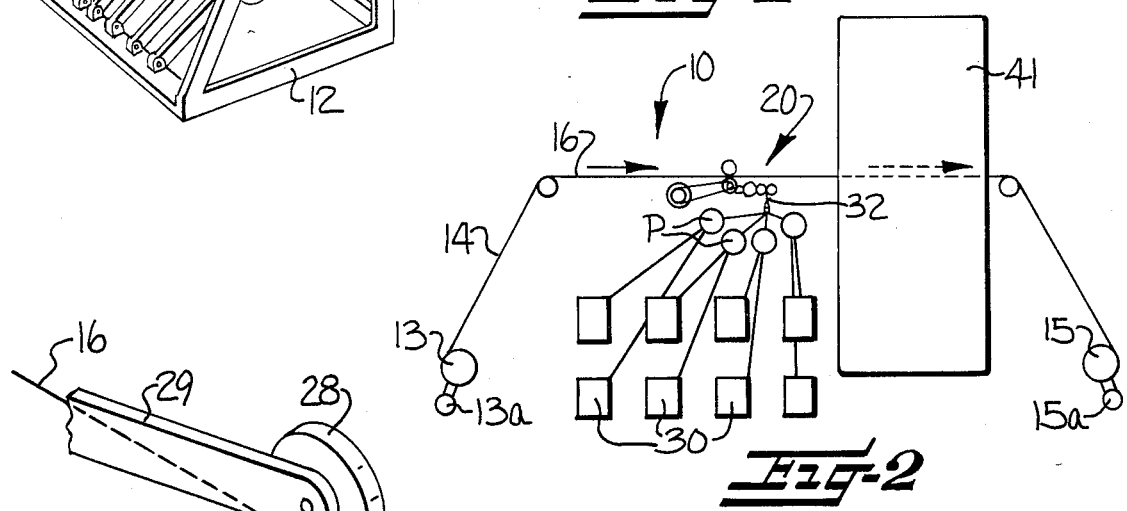
FIG. 2 is a side elevational schematic view of one of the operating positions of the machine of FIG. 1.

Referring now more specifically to the drawings, FIG. 1 illustrates a machine 10 of the invention having a plurality of operating positions. In the machine shown, there are eight such operating positions employed. Each such position is contained within and supported by machine frame 12 and includes a supply spool 13 of strand material 14 carried by one end of frame 12 and a takeup spool 15 for strand material carried by the other end of frame 12. For each strand 14, a respective predetermined individual strand pathway 16 extends along said machine frame 12 between said supply spool 13 and said takeup spool 15 and determines the path upon which strand 14 is moved. Desirably both said supply spool 13 and said takeup spool 15 have drive motors associated therewith (shown schematically in FIG. 2 as 13a and 15a respectively) for moving said strand 14 at a controlled rate of speed and with a controlled amount of tension.

For each strand, an ink applicator apparatus or module 20 is provided along the strand pathway 16 and is associated with a respective individual supply 30 of curable viscous ink carried by frame 12 and adapted for coloring the moving strand 14. Each supply 30 includes an ink pump P (FIG. 2) and a curable viscous ink 31 of desired color. After ink applicator apparatus 20 applies a coating of curable viscous ink 31 to strand 14, strand 14 is passed through passageway 40 where it is subjected to means for curing the coating of ink on strand 14. This is positioned along strand pathway 16 between ink applicator 20 and takeup spool 15.

Referring now to FIGS. 3 through 10 and more specifically to ink applicator module 20, said module apparatus further comprises a series of rotatable rollers successively arranged in driving engagement with peripheral surfaces of adjacent rollers in contact with one another. Said series of rollers includes a first roller 21 at one end of the series having its peripheral surface positioned in engagement with a second roller 22 of the series to define an ink receiving nip 23. Said series of rollers also includes an applicator roller 24 at the end of the series opposite that of said first roller 21. Applicator roller 24 is adapted for applying the desired coating of ink 31 to the strand 14.

Figure 3:
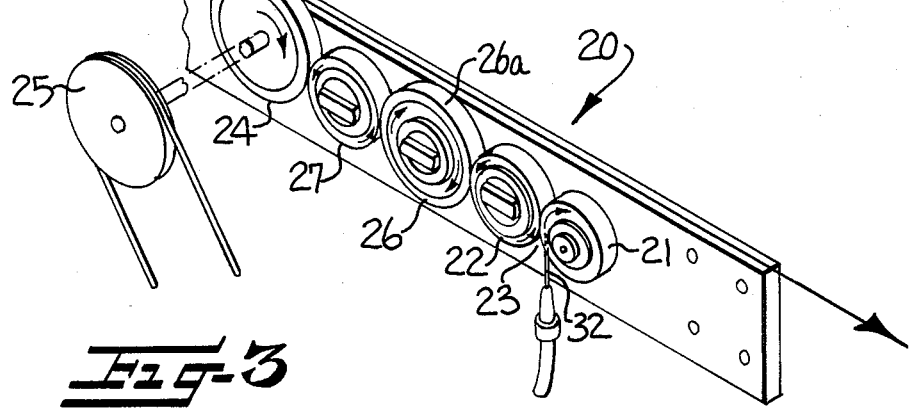
FIG. 3 is a fragmentary perspective view of an applicator module of the invention.

An ink injector 32 in the form of a hollow tube directs the selected ink to the ink receiving nip 23. Means is provided for rotating the rollers of the series so that ink 31 is successively transferred from the ink receiving nip 23 along the peripheral surfaces of each of the rollers in the series and to the applicator roller 24. The means for rotating the rollers, as shown in FIG. 3, can comprise drive means in the form of a drive roller 25 driven by a drive motor (not shown). Drive roller 25 is operatively connected to and directly drives applicator roller 24. The remaining rollers of the series are mounted for free rotation and are thus driven by the movement of applicator roller 24.

Figure 4:
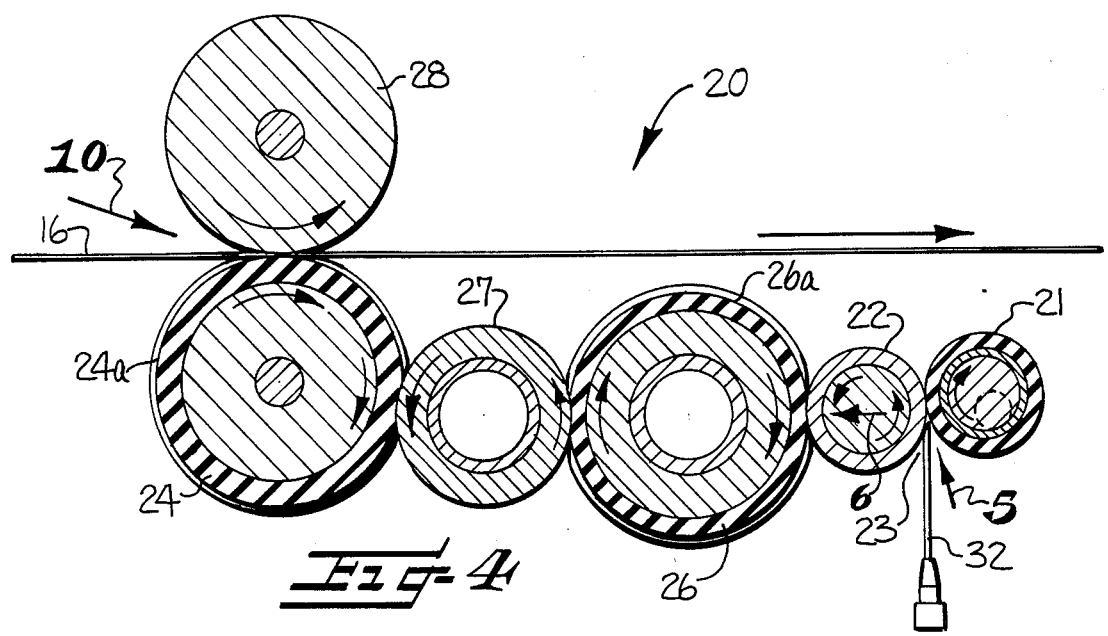
FIG. 4 is a side cross-sectional view of the applicator module.
Figures 5, 6, 7, 8, 9:
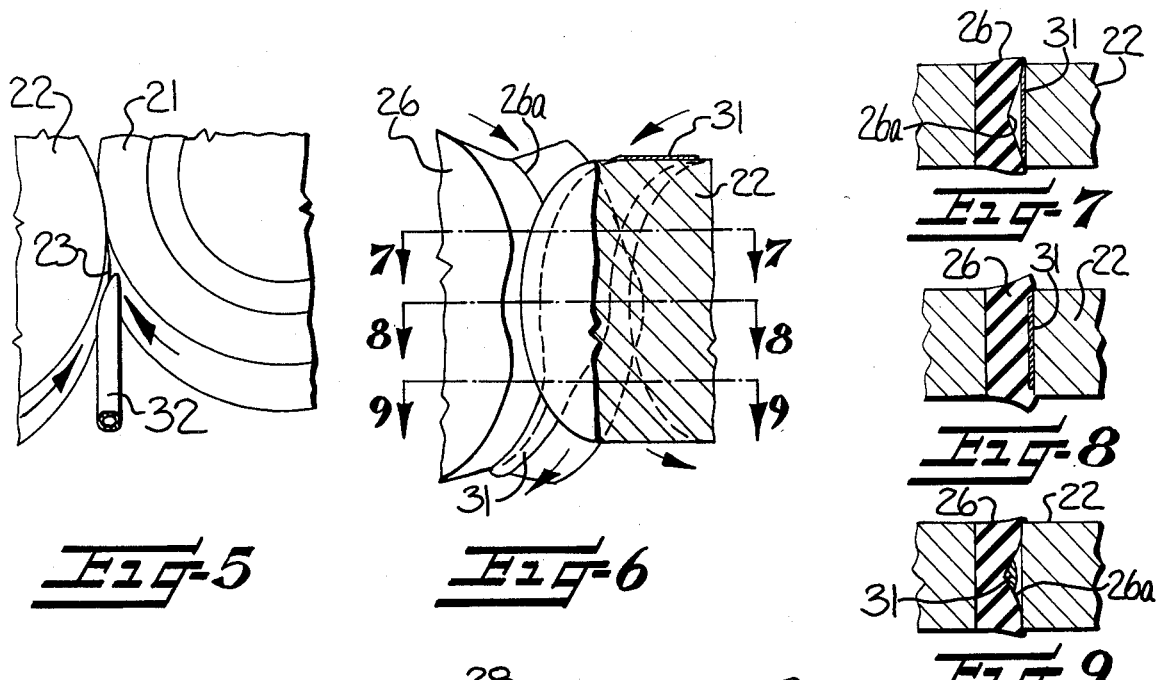
FIG. 5 is a fragmentary detailed perspective view as viewed from the arrow 5 of FIG. 4.
FIG. 6 is a fragmentary perspective view with details exaggerated for illustration of the juncture designated as 6 of FIG. 4.
FIG. 7 is a fragmentary horizontal cross section taken along the lines 7—7 of FIG. 6.
FIG. 8 is a fragmentary horizontal cross section taken along the lines 8—8 of FIG. 6.
FIG. 9 is a fragmentary horizontal cross section taken along the lines 9—9 of FIG. 6.

As shown in FIGS. 3 and 4, an ink positioning roller 26 is mounted in peripheral engagement with second roller 22 for transferring the ink 31 from the peripheral surface of the second roller 22 to the peripheral surface 26a of the ink positioning roller 26. The peripheral surface 26a of the ink positioning roller 26 is desirably formed of a resilient elastomeric material, such as rubber or plastic, and as shown in FIGS. 6 and 7 has a circumferentially extending concavity formed therein so as to be desirably v-shaped in cross section. And as shown in slightly exaggerated fashion in FIG. 6 (as well as in FIGS. 7 through 9), in operation the peripheral surface 26a of the ink positioning roller 26 tightly engages the peripheral surface of the second roller 22 so that upon rotation of the ink positioning roller 26, this concavity is flattened as it passes through the nip. This serves to work and flatten out the viscous ink 31 and spread it evenly across the peripheral surface 26a. Then as the ink positioning roller 26 further rotates, its peripheral surface 26a returns to its concave configuration upon leaving the nip and the ensuing suction action between the peripheral surface 26a and the ink 31 causes the ink 31 to move to the apex of the v-shape of surface 26a. Ink 31 is thus deposited on the peripheral surface 26a of the ink positioning roller 26 and centered in the circumferentially extending concavity. Ink 31 is then centrally positioned as desired on the positioning roller 26 and on succeeding rolls and on strand 14.

The series of rollers of the applicator module 20 also includes an ink transfer roller 27 mounted between the ink positioning roller 26 and the applicator roller 24. This transfer roller 27 cooperates with the applicator roller 24 for transferring the centered ink 31 from the ink positioning roller 26 to the applicator roller 24.

In the series of roller the peripheral surfaces of each roller is desirably formed of a different material from that of each adjoining roller (for example, rubber to metal to rubber to metal to rubber) to facilitate the transfer ink 31 from one adjacent roller to the next. Each roller also has an external diameter different from that of any other roller in the series to eliminate the possibility of an undesirably repeating pattern of ink being formed. Furthermore, the rollers in the series are desirably mounted about parallel axes, with first roller 21 being mounted on an eccentric shaft to impart a variable contact pressure on the respective rollers in the series.

At the application end of the series of rollers is applicator roller 24. In association therewith there is provided means for directing the moving strand 14 tangentially across the peripheral surface 24a of the applicator roller 24 so as to apply a substantially uniform coating of ink 31. There is included a weighted roller 28 mounted on an idler arm 29 which cooperates with and is in peripheral contact with the applicator roller 24. The weighted roller 28 is thus mounted for passage of the moving strand 14 between it and the applicator roller 24, and it maintains a predetermined contact pressure on the strand 14 as it contacts the applicator roller 24.

Applicator roller 24 preferably has a peripheral surface 24a formed of a resilient elastomeric material in the area in which strand 14 contacts the surface of applicator roller 24. This is to assure intimate contact of the strand 14 with the peripheral surface 24a of the applicator roller and the ink 31 carried thereby so that the coating of ink 31 being applied extends to at least 180° of the circumference of strand 14. The coating of ink 31 can be applied continuously along the length of strand 14 or discontinuously so as to be patterned in bands by using an applicator roller with a predetermined surface.

Figure 10:
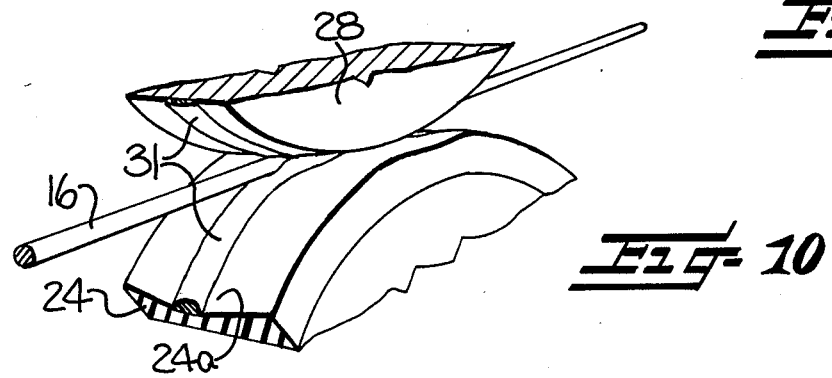
FIG. 10 is a fragmentary perspective view as viewed from the arrow 10 of FIG. 4.

Optionally, and as illustrated in FIG. 10, the peripheral surface 24a of the applicator roller may be provided with a circumferentially extending concavity therein similar to that of the ink positioning roller 26. This concavity serves to assist in centering the ink on the peripheral surface 24a of roller 24 in a manner similar to that previously described in connection with roller 26. The concavity also desirably serves for keeping the fiber centered on the applicator roller for more uniform application of the ink.

As mentioned above, the primary use of machine 10 is the treatment of a plurality of moving strands of buffer coated glass fibers with a coating of curable viscous ink so as to rapidly and economically color code substantial quantities of glass fiber waveguides.

Ink 31 is desirably an ultraviolet curable ink containing no volatiles that would present undesired processing and environmental problems. The coating of ink applied to strands 14 is cured by passing the plurality of moving strands 14 through passageway 40 wherein they are exposed to ultraviolet radiation generated by one or more suitable sources thereof (not shown) contained in cabinet 41. This curing is accomplished almost instantly which allows the strands to be moved along at relatively fast speeds of up to about 150 meters per minute.

Ink applicator apparatus module 20 is likewise adapted to suitably coat the moving strands at relatively fast speeds. Use of this module 20 with its series of rollers allows for the discrete provision of precise amounts of ink 31 in order to form the relatively thin and substantially uniform coating thereof on strands 14. This apparatus permits continuous or intermittent coatings of ink of less than about 10 microns to be readily applied to strands 14. Furthermore, the speed of pump P is correlated with the rate of application of ink to the moving strand 14 so as to result in no accumulation of ink at the point of ink application to strand 14. The ink is applied and taken away by the moving strand 14 as fast as it is delivered thereto by ink applicator module 20.

A control console 50 (FIG. 1) houses the controls for determining the various machine functions including strand speed, dye color application, and curing operation.

In the drawings and specification, there have been disclosed typical preferred embodiments of the invention, and although specific terms are employed, they are used in a generic and descriptive sense only and not for purposes of limitation.

That which is claimed is:

1. An apparatus for applying and curing a coating of a viscous ink to a moving strand comprising
   a machine frame,
   a strand supply spool carried by one end of said frame for accommodating a supply of strand material to be coated,
   a strand takeup spool carried by another end of said frame for receiving the coated strand,
   means for moving said strand material from the strand supply spool along a predetermined strand pathway and to the strand takeup spool,
   applicator means provided along the strand pathway for applying a coating of curable viscous ink to the moving strand,
   means for supplying the curable viscous ink to said applicator means, and
   means provided along the strand pathway and between said ink applicator means and said takeup spool for curing the coating of viscous ink on said strand,
   said ink applicator means comprising
   a series of rotatable rollers successively arranged in driving engagement with peripheral surfaces of adjacent rollers in contact,
   said series of rollers including a first roller at one end of the series having its peripheral surface positioned in engagement with a second roller of the series to define an ink receiving nip,
   said series of rollers also including an applicator roller at the opposite end of the series from said first roller adapted for applying the ink coating to the strand,
   at least one of the rollers in said series having its peripheral surface formed of a resilient elastomeric material and having a circumferentially extending concavity formed in the peripheral surface, and wherein the concave peripheral surface thereof tightly engages the peripheral surface on the adjacent roller so that upon rotation of the roller said concavity is flattened as it passes through the nip and returns to its concave configuration upon leaving the nip whereby the ink which is deposited on the peripheral surface of the ink positioning roller is centered in the circumferentially extending concavity.
   means for directing the viscous ink into said ink receiving nip,
   means for rotating the rollers of the series for thereby successively transferring the ink from said ink receiving nip along the peripheral surfaces of each of the rollers in the series and to said applicator roller, and
   means for directing the moving strand substantially tangentially across the surface of the applicator roller to thereby apply a substantially uniform coating of the ink to the strand.

2. An apparatus according to claim 1 wherein the series of rollers of said applicator means thereof includes an ink positioning roller mounted in peripheral engagement with said second roller for transferring the ink from the peripheral surface of the second roller to the peripheral surface of the ink positioning roller, and wherein said at least one resilient concave surfaced roller is said ink positioning roller.

3. An apparatus according to claim 2 wherein said applicator roller also has a circumferentially extending concavity formed in the peripheral surface thereof centering the ink on the peripheral surface of the roller and for also assisting in maintaining the moving strand in centered relation on the surface of the applicator roller.

4. An apparatus according to claim 1 wherein the means for imparting rotation to the series of rollers of the applicator apparatus thereof comprises drive means cooperating with said applicator roller, and wherein the remaining rollers in said series are mounted for free rotation and are driven by the movement of said applicator roller.

5. An apparatus according to claim 1 wherein the means for directing the moving strand substantially tangentially across the surface of the applicator roller of the applicator apparatus thereof includes means for directing the strand tangentially across the upper surface of the applicator roller, and additionally including a weighted roller cooperating with the applicator roller and in peripheral contact therewith and mounted for passage of the strand therebetween so as to maintain a predetermined contact pressure on the strand as it contacts the applicator roller.

6. An apparatus according to claim 1 wherein the strand material is a glass fiber and the viscous ink is a UV curable ink and wherein the means for curing the coating of viscous ink includes a source of ultraviolet radiation.

7. An apparatus for applying and curing a coating of a viscous ink to a plurality of moving strands of glass fiber including.
   a machine frame,
   a plurality of strand supply spools carried by one end of said frame for accommodating a supply of glass fiber strand material to be coated,
   a plurality of strand takeup spools carried by another end of said frame for respectively receiving the coated strands,
   means for moving said strand material from the respective strand supply spools along respective individual predetermined strand pathways and to the respective strand takeup spools, a respective ink applicator means provided along each individual strand pathway for applying a coating of UV curable ink to the moving glass fiber strand, means for supplying the UV curable ink to the respective ink applicator means, and means provided along adjacent respective portions of the strand pathways and between said plurality of ink applicator means and takeup spools for curing the coating of viscous ink on each of the strands, each of said ink applicator means comprising first and second freely rotatable rollers mounted in peripheral engagement with one another to define an ink receiving nip, means for directing the UV curable viscous ink into said ink receiving nip, a rotatable ink positioning roller mounted in peripheral engagement with said second roller and cooperating therewith for transferring the ink from the peripheral surface of the second roller to the peripheral surface of the ink positioning roller, said ink positioning roller having a peripheral surface formed of a resilient elastomeric material, and wherein the peripheral surface of the roller is of a generally v-shaped concave configuration, and wherein the peripheral surface of said ink positioning roller contacts the surface of said second roller under sufficient pressure that said concavity is compressed and flattened as it passes through the nip defined between said second roller and said ink positioning roller and returns to its concave configuration upon leaving the nip whereby the ink is centered in the v-shaped concavity, an ink transfer roller mounted in peripheral contact with said ink positioning roller and cooperating therewith for transferring and receiving the ink from the ink positioning roller, an applicator roller positioned in peripheral contact with said ink transfer roller for receiving the ink from the transfer roller, means for directing the moving strand substantially tangentially across the surface of the applicator roller for thereby applying a substantially uniform coating of the ink to the surface of the moving strand, and means for imparting rotation to the respective rollers in the series whereby the ink is transferred successively along the respective rollers from said ink receiving nip to said applicator roller.

8. An applicator apparatus for applying a coating of a viscous ink to a moving strand, said apparatus comprising a series of rotatable rollers successively arranged in driving engagement with peripheral surfaces of adjacent rollers in contact, said series of rollers including a first roller at one end of the series having its peripheral surface positioned in engagement with a second roller of the series to define an ink receiving nip, said series of rollers also including an applicator roller at the opposite end of the series from said first roller adapted for applying the ink coating to the strand, at least one of the rollers in said series having its peripheral surface formed of a resilient elastomeric material and having a circumferentially extending concavity formed in the peripheral surface, and wherein the concave peripheral surface thereof tightly engages the peripheral surface of the adjacent roller so that upon rotation of the roller said concavity is flattened as it passes through the nip and returns to its concave configuration upon leaving the nip whereby the ink which is deposited on the peripheral surface of the ink positioning roller is centered in the circumferentially extending concavity.

means for directing the viscous ink into said ink receiving nip, means for rotating the rollers of the series for thereby successively transferring the ink from said ink receiving nip along the peripheral surfaces of each of the rollers in the series and to said applicator roller, and means for directing the moving strand substantially tangentially across the surface of the applicator roller to thereby apply a substantially uniform coating of the ink to the strand.

9. An applicator apparatus according to claim 8 wherein said series of rollers includes an ink positioning roller mounted in peripheral engagement with said second roller for transferring the ink from the peripheral surface of the second roller to the peripheral surface of the ink positioning roller, and wherein said at least one resilient concaved surfaced roller is said ink positioning roller.

10. An applicator apparatus according to claim 9 wherein said series of rollers includes an ink transfer roller mounted between said ink positioning roller and said applicator roller and cooperating therewith for transferring the centered ink from the ink positioning roller to the applicator roller.

11. An applicator apparatus according to claim 8 wherein said means for imparting rotation to the series of rollers comprises drive means cooperating with said applicator roller, and wherein the remaining rollers in said series are mounted for free rotation and are driven by the movement of said applicator roller.

12. An applicator apparatus according to claim 8 wherein the rollers in said series are mounted for rotation about parallel axes, and wherein said first roller includes an eccentric shaft means for imparting a variable contact pressure on the respective rollers in the series.

13. An applicator apparatus according to claim 8 wherein said means for directing the moving strand substantially tangentially across the surface of the applicator roller includes means for directing the strand tangentially across the upper surface of the applicator roller, and additionally including a weighted roller cooperating with the applicator roller and in peripheral contact therewith and mounted for passage of the strand therebetween so as to maintain a predetermined contact pressure on the strand as it contacts the applicator roller.

14. An applicator apparatus for applying a coating of a viscous ink to a moving strand, said applicator apparatus comprising first and second freely rotatable rollers mounted in peripheral engagement with one another to define an ink receiving nip, means for directing a viscous ink into said ink receiving nip, a rotatable ink positioning roller mounted in peripheral engagement with said second roller and cooperating therewith for transferring the ink from the peripheral surface of the second roller to the peripheral surface of the ink positioning roller, said ink positioning roller having a peripheral surface formed of a resilient elastomeric material, and wherein the peripheral surface of the roller is of a generally v-shaped concave configuration, and wherein the peripheral surface of said ink positioning roller contacts the surface of said second roller under sufficient pressure that said concavity is compressed and flattened as it passes through the nip defined between said second roller and said ink positioning roller and returns to its concave configuration upon leaving the nip whereby the ink is centered in the v-shaped concavity, an ink transfer roller mounted in peripheral contact with said ink positioning roller and cooperating therewith for transferring and receiving the ink from the ink positioning roller, an applicator roller positioned in peripheral contact with said ink transfer roller for receiving the ink from the transfer roller, means for directing the moving strand substantially tangentially across the surface of the applicator roller for thereby applying a substantially uniform coating of the ink to the surface of the moving strand, and means for imparting rotation to the respective rollers in the series whereby the ink is transferred successively along the respective rollers from said ink receiving nip to said applicator roller.

* * * * *